Feb. 12, 1924.
G. FOX
JOINT OR CONNECTION
Original Filed July 24, 1920
1,483,294
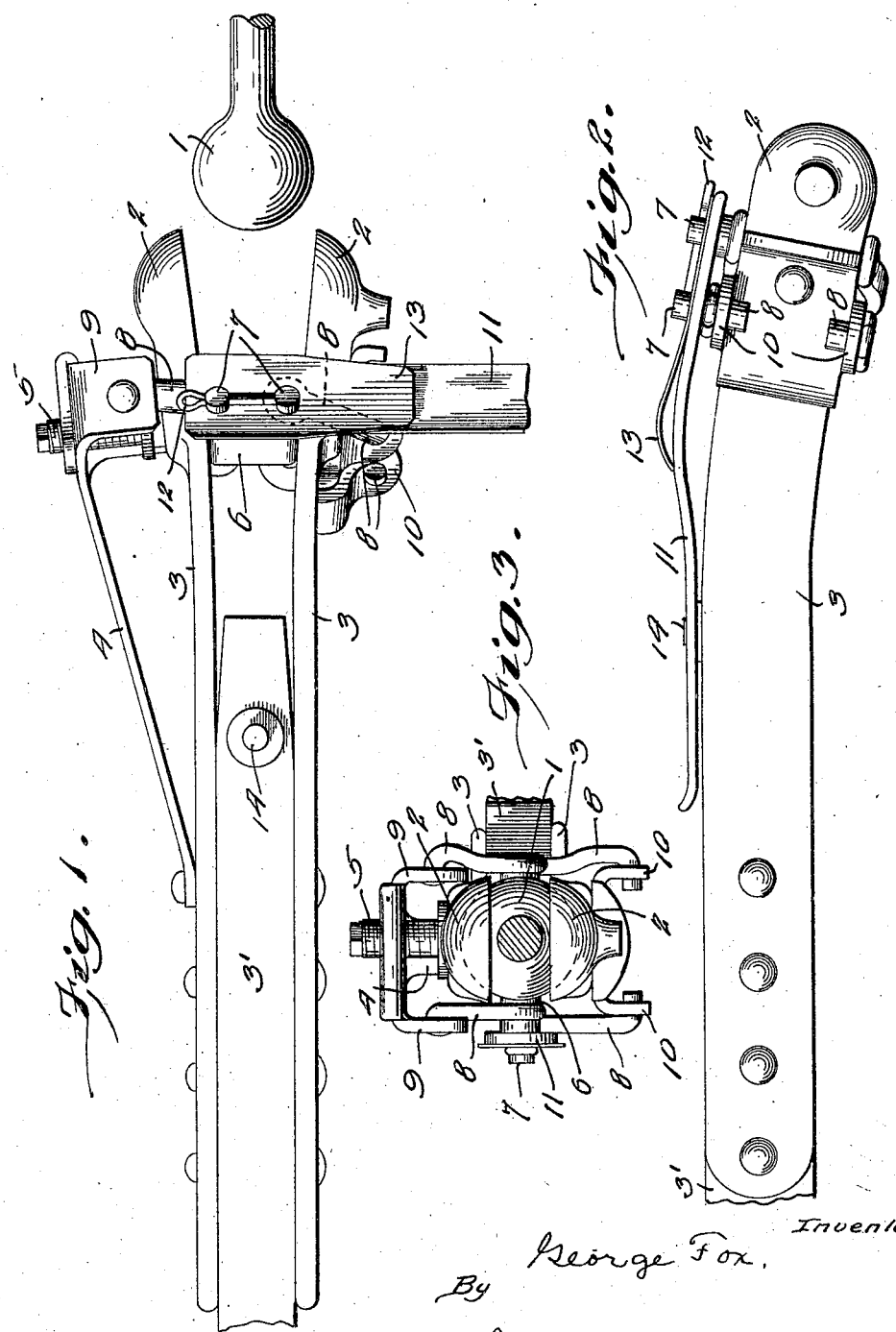
Inventor
George Fox,
By
Langdon Moore.
Attorney Patented Feb. 12, 1924.

1,483,294

UNITED STATES PATENT OFFICE.

GEORGE FOX, OF LEXINGTON, NEBRASKA.

JOINT OR CONNECTION.

Application filed July 24, 1920, Serial No. 398,663. Renewed December 29, 1923.

*To all whom it may concern:*

Be it known that I, GEORGE FOX, a citizen of the United States, residing at Lexington, Nebraska, have invented certain new and useful Improvements in a Joint or Connection, set forth in the following specification, reference being had therein to the accompanying drawing.

This invention relates to a joint or connection. While its application is unrestricted, it has been found to be particularly successful in connection with a sickle head. It is contemplated to provide a device of this character which will provide for quick attachment and detachment of the parts, which may be practically and commercially manufactured from a few standard parts, easily assembled and which will, when so arranged comprise a strong and compact device.

Other objects and advantages will in part be apparent, and in part be brought out more fully in the description which follows. A drawing illustrating an embodiment of the invention is attached, the following views being shown:

Fig. 1, is a view in side elevation showing the parts in open or disassembled position;

Fig. 2, is a view of a portion of the device shown in bottom plan; and

Fig. 3, is a view in end elevation, a portion being shown in section.

In these views, 1 designates any member to be connected to, such as a ball. Adapted to embrace and securely hold the ball are two coacting sockets 2, carried on the ends of resilient members 3, secured at their opposite ends to a member 3' which may be any suitable mechanism.

Additional means of adding resiliency to the socket members and forcing them more positively together are provided, and as here shown comprise an arm 4, secured at one end to member 3', and at its opposite end carrying an adjusting means such as a screw 5, threaded into the end of the arm and bearing on one of the sockets 2 or resilient members 3.

Means are provided for positively moving the resilient members 2 apart and also for positively locking them in closed position. As here shown there is a spreader member 6 disposed between the resilient arms 3. This carries at opposite sides of its outer edges, studs or projections 7, which constitute bearings for links 8. Two of these are connected to and have a bearing in ears 9 carried by the arm 4. The other two links are secured to the opposite side of the spreader and have a bearing in eyes provided in offset lugs 10 disposed on the other resilient member 2.

An actuating lever 11 is attached to two of the projecting lugs on the spreader as by cotter pin 12, the latter being locked by member 13. Means are likewise provided to retain the lever in closed position and as here shown a keeper 14 is disposed on member 3' and adapted to engage in an opening in the lever when in closed position.

In operation, removal of the lever from the keeper and moving it to the position shown in Fig. 1, produces a spreading of members 2 positively through the bearing of the edges of the spreader upon the surfaces of these members. It also produces a movement of resilient arm 4 by means of the toggle links and will permit the insertion of the ball 1. Movement of the lever in an opposite direction permits the resilient members to return to their normal position which will embrace the ball, and also draws down upon resilient arm 4 through the toggle links. The resiliency of the bearing of this arm being regulated by the adjusting screw will assure the proper frictional engagement between the ball and socket members and prevent rattling or loosening of the parts.

From the foregoing it will be apparent that the device is a practical means of effecting the objects desired and while it has been illustrated in the embodiment herein shown, it will be understood that I do not desire to be limited to any particular use or to the precise construction of this embodiment except as within the scope of the claims.

What I claim is:

1. A device of the character described comprising a member to be connected; members to connect with this member, carried by arms; a support for said arms; a spreader member disposed between the arms; means for manipulating the spreader to spread apart the arms; adjustable pressure means associated with one of the arms for varying pressure exerted to force the arms together; and a connection between this means and the spreader.

2. A device as set forth in claim 1 wherein the means for manipulating the spreader comprises a lever secured thereto; and means for locking the parts in closed position.

3. A device of the character described including a support; resilient arms disposed thereon; socket members carried by said arms; a spreader disposed between the arms; a resilient member having a bearing on one of the arms; means for adjusting the relationship of these members; links connecting the spreader and resilient member; links connecting the spreader and one of the resilient arms; and a lever for operating the spreader.

4. A device of the character described, comprising a support; coacting arms mounted at one end upon the support, their outer ends being free; a member-engaging and retaining means on the outer end of each arm; a spreader disposed between the arms and having edge portions adapted to engage the inner surface of the arms and spread them apart when actuated; a member connecting the spreader and one of the arms; a resilient pressure device normally exerting pressure on one of the arms and tending to force it inwardly; and means for operating the spreader.

5. The structure set forth in claim 4, wherein the spreader operating means includes a lever attached to the spreader; and means for normally holding the lever in inoperative position.

6. The structure set forth in claim 4; and means for adjusting the pressure exerted on the arm.

In testimony whereof I affixe my signature.

GEORGE FOX.